Jan. 1, 1929.　　　　　P. A. FISCHER　　　　　1,697,271
GARTER
Filed June 14, 1927
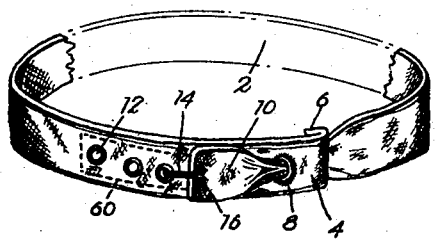
Fig.1.
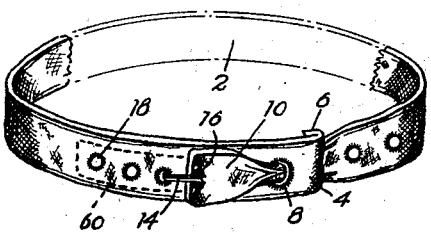
Fig.2.
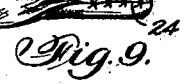
Fig.9.
Fig.3.　　　　　Fig.4.
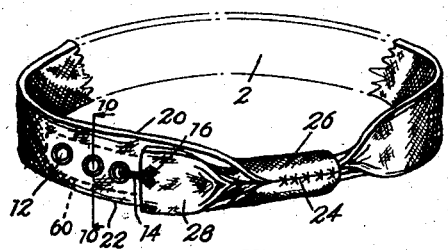
Fig.5.
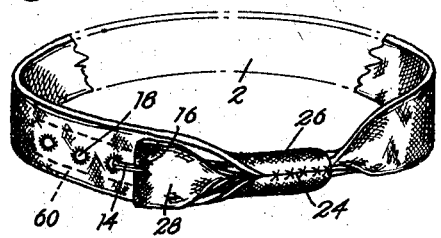
Fig.6.
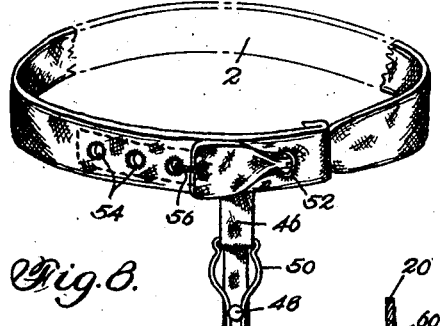
Fig.8.
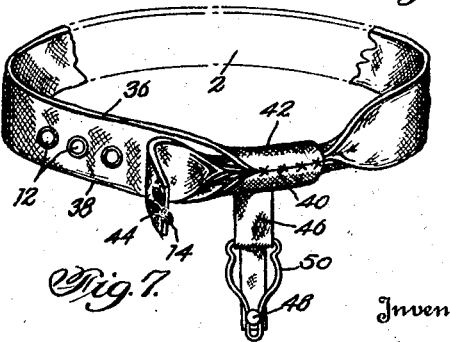
Fig.7.
Fig.10.
Inventor
Philip A. Fischer
By
Martin T. Fisher Attorney Patented Jan. 1, 1929.

1,697,271

UNITED STATES PATENT OFFICE.

PHILIP A. FISCHER, OF NEW YORK, N. Y.

GARTER.

Application filed June 14, 1927. Serial No. 198,813.

This invention is a garter of the limb encircling type, and constitutes improvements over the garters shown in my copending applications, Serial Nos. 69,025 and 69,026, both filed November 14, 1925.

The garter of this invention comprises a band of textile material, preferably of wool and preferably having a rough fibrous surface texture, although, of course, other appropriate materials could be used. One end of the band is provided with a restricted passage, through which the other end of the band is threaded, thereby imposing a frictional retaining force on that end of the band threaded therethrough.

The constricted passage may be a hole through the end of the band passing through the hole or it may be a tube, the other end of the band passing through the hole or tube, as the case may be.

The frictional retaining force imposed by the restricted passage is ordinarily not sufficient to retain the garter around the leg of the wearer and so in order to secure the end of the band, the band is provided with holes, apertures or sockets at a plurality of points, and the end of the garter that is threaded through the passage is provided with a hook, stud, projection or the like for detachably engaging with the described holes, apertures or sockets for securing the end of the garter in adjusted position.

The holes, apertures or sockets may be suitably reenforced as by eyelets, by sewing, or by the use of the usual snap fasteners of the stud and socket type. The apertures may, if desired, be woven directly into the band during manufacture.

The main features of the invention having thus been pointed out, reference will now be made to the accompanying drawings showing a number of ways of carrying out the invention.

In these drawings,

Fig. 1 is a view showing the hole form of garter with eyeleted apertures;

Fig. 2 shows a similar type of garter with button-hole apertures;

Fig. 3 shows the tube form with eyeleted apertures;

Fig. 4 shows the tube form with button-hole apertures;

Figs. 5 and 6, respectively show the hole and tube forms with stud and socket fasteners;

Fig. 7 shows a tube form provided with a hosiery engaging member;

Fig. 8 shows the hole form provided with a hosiery engaging member.

Fig. 9 is a fragmentary view showing woven apertures; and,

Fig. 10 is a section on 10—10, Fig. 3.

Referring now to these drawings in which similar reference characters represent similar parts, the garter comprises a band 2 the end 4 of which is hemmed as shown at 6, this end being provided with a constricted passage 8, through which the other end 10 of the band is threaded, the passage 8 being small enough to impose a frictional retaining force on the end 10 of the band threaded therethrough.

The band 2 is preferably made of textile fabric, preferably wool, and preferably having a rough fibrous texture so that it will engage frictionally with the stocking, such as a golf stocking, for which this garter is especially adapted.

The band, near the end 4, is provided with a plurality of eyeleted holes 12, adapted to receive a hook 14 secured at 16 to the end 10 of the garter. The end 10 may thereby be detachable secured in a plurality of positions.

In Fig. 2, the band is provided with a plurality of reenforced apertures 18, which may be reenforced by sewing the edges, as is done to reenforce a button-hole. Apertures 18, before being reenforced, may be woven in or cut in the band 2.

Referring to Fig. 3, the upper and lower edges 20 and 22 of the band are brought together and sewed along the line 24, thereby forming a constricted passage or tube 26 through which the other end 28 of the band is threaded. In this form the band is provided with eyeleted apertures 12 and hook 14. The tubular passage imposes a frictional retaining force on the part threaded therethrough.

Referring now to Fig. 4, this form of garter is generally similar to that shown in Fig. 3, being provided with a plurality of worked holes, 18, into which a hook 14 engages as before.

In Fig. 5, the band is provided with the constricted passage 8, through which the other end of the garter is threaded. The band near one end has a plurality of stud or socket fasteners 30, which are adapted to secure detachably a socket or stud fastener 32 carried on the end 34 of the band which is threaded through the hole 8.

The garter shown in Fig. 6 is provided with stud and socket fasteners 30 and 32, the garter in this case being of the tube form, the tube being indicated at 26, and formed as described in connection with Fig. 3.

In Fig. 7, the upper and lower edges 36 and 38 of the band 2 are sewed together along the line 40 to form the tube 42, thereby providing a constricted passage, through which the other end 44 of the band is threaded. This end 44 is provided with a hook 14, adapted to engage detachably in one of a plurality of eyeleted apertures 12. This form of the invention is provided with a depending hosiery engaging member comprising a supporting part 46, stud 48 and frictional clamp 50.

In Fig. 8, one end of the band 2 may be provided with a constricted passage 52 and eyelet or button apertures 54; the other end of the band is threaded through the constricted passage 52 and is provided with a hook 56 for detachably engaging with the reenforced apertures 54. This garter is provided with a hosiery engaging member as described in connection with Fig. 7.

Any of the described forms of the garter may be provided with apertures 58, shown in Fig. 9, woven into the band during manufacture. All of the described forms may, if desired, be provided with a protecting piece 60, Fig. 10, sewed to the inside of the band 2, back of the apertures, for shielding the end of the hook and preventing it catching the stocking.

While I have illustrated my invention in some detail, it should be understood that the invention is not limited to the details shown, but may be carried out in other ways.

I claim as my invention:

1. A garter of the limb encircling type comprising a band having a constricted passage near one end, the other end of the band being threadable through said constricted passage, the constricted passage imposing a frictional restraining force on the band threaded therethrough, the band having a plurality of fastening devices spaced along it, inwardly of said constricted passage, and cooperating fastening means carried by the end of the band that is threaded through the constricted passage, for engaging with said fastening devices, the threaded-through end of the band overlying and lying flat against the band proper.

2. A garter of the limb encircling type comprising a band having a constricted passage near one end, the other end of the band being threadable through said constricted passage, the constricted passage imposing a frictional restraining force on the band threaded therethrough, the band having a plurality of reenforced apertures spaced along it, inwardly of said constricted passage, and a cooperating fastening member carried by the threaded-through end of the band, for engaging with said reenforced apertures; said threaded-through end extending unidirectionally and overlying the band proper.

3. A garter of the limb encircling type comprising a band made by textile material having a rough, fibrous surface texture and having a constricted passage near one end, the other end of the band being threadable through said constricted passage, said constricted passage, in cooperation with the inter-engagement of the fibers of the band, imposing a frictional restraining force on the end of the band threaded therethrough, the band having a plurality of fastening means spaced therealong, inwardly of said constricted passage, and cooperating fastening means carried by the threaded-through end of the band, said threaded through end of the band overlying the band when in final position on the leg of the wearer.

4. A garter of the limb encircling type comprising a band made by textile material having a rough, fibrous surface texture and having a constricted tubular passage near one end, the other end of the band being threadable through said constricted passage, said constricted passage, in cooperation with the interengagement of the fibers of the band, imposing a frictional restraining force on the end of the band threaded therethrough, the band having a plurality of reenforced apertures spaced along it, inwardly of the constricted passage, and cooperating fastening means carried by the threaded-through end of the band, for engaging with said reenforced apertures, said threaded through end overlying the band proper when in final position on the leg of the wearer.

5. A garter of the limb encircling type comprising a band having a tubular passage near one end, the other end of the band being threadable through said tubular passage, the tubular passage imposing a frictional restraining force on the band threaded therethrough, the band having a plurality of fastening devices spaced along it, inwardly of said tubular passage, and cooperating fastening means carried by the end of the band that is threaded through the tubular passage, for engaging with said fastening devices, the threaded-through end of the band overlying and lying flat against the band proper.

6. A garter of the limb encircling type comprising a band having a tubular passage near one end, the axis of the tubular passage being substantially lengthwise of the garter, the other end of the band being threadable through said tubular passage, the tubular passage imposing a frictional restraining force on the band threaded therethrough, the band having a plurality of reenforced apertures spaced along it, inwardly of said tubular passage, and a cooperating fastening member carried by the threaded-through end of the band, for engaging with said reenforced apertures; said threaded-through end extending unidirectionally and overlying the band proper.

In testimony whereof I affix my signature.

PHILIP A. FISCHER.